Patented Nov. 10, 1931

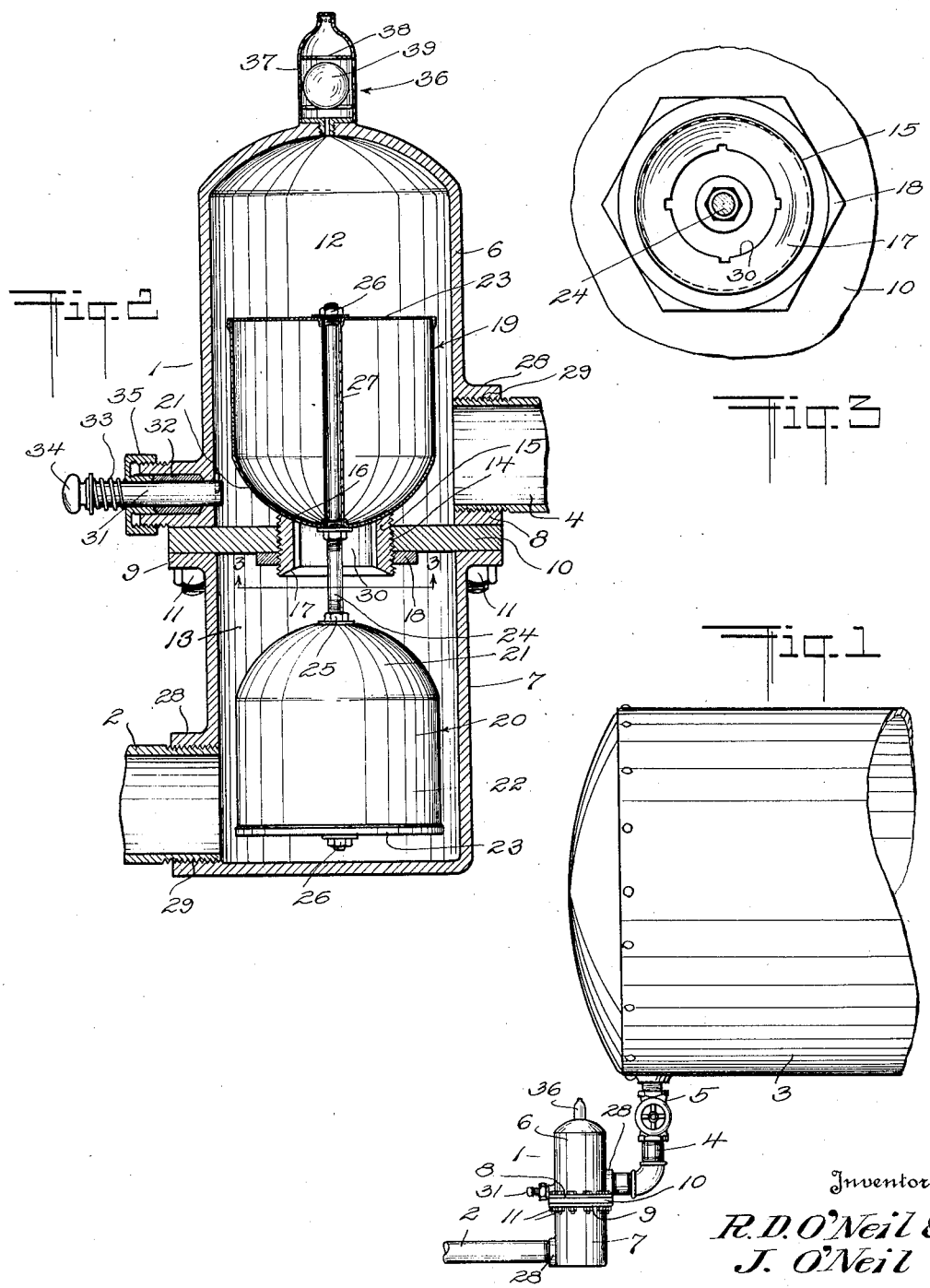

1,831,318

UNITED STATES PATENT OFFICE

RALPH D. O'NEIL, OF ROSEVILLE, AND JOHN O'NEIL, OF COLUMBUS, OHIO

FLOAT OPERATED VALVE

Application filed April 19, 1930. Serial No. 445,580.

This invention relates to shut-off valves and is more particularly directed to the float operated automatic type for governing the liquid flow through an associated conduit or pipe line.

The primary object of the present invention resides in the provision of a valve of this character which has for one of its uses the connection with an oil line through which oil is conveyed from one point to another and wherein the valve functions to permit of the free flow of oil through the line, but when the oil ceases flowing or the line becomes empty the valve will automatically close to prevent air or gas from entering the pipe line.

In oil fields where the oil is usually stored in one or a plurality of tanks the oil is pumped from said tanks to tank cars or to larger tanks or reservoirs for storage. From these first named tanks branched pipe lines lead to a common pipe line in which is positioned a pump or pumps for drawing or pumping the oil from the tanks to the place of storage or disposal. Between the tanks and the branched pipe lines valves are positioned which are usually of the hand or manually controlled type and by the opening of which the oil may flow through the said branch lines into the common pipe line by the aid of gravity and the pump. This arrangement offers some objections in that when certain tanks or a tank becomes empty, air enters the line due to the fact that the top of the tank or tanks containing the oil are usually open to the atmosphere causing the pump to get air-bound or pumping air with the result that the pump or pumps speed up and are very apt to become damaged thereby necessitating shut-downs and costly repairs.

Another objection is that in cases where one or more of the tanks are located at a higher level the oil released therefrom may cause a back flow of the oil into the line and into the tanks located at lower levels causing overflow of the tanks and rendering it exceedingly difficult to check the amount of oil in the various tanks.

It is to overcome these and other objections that the valve structure comprising the present invention has been designed, wherein the present structure is provided with a double acting float valve cooperating with a pair of valve seats and which float valve under normal operating conditions will permit of the free oil flow therethrough and will not only prevent air from entering the pipe line but also precludes backing up of the oil beyond the valve.

A further object of the invention lies in the provision of a valve structure which is of an extremely simple construction, comprises only a few working parts and which is so constructed that it may be assembled and disassembled very readily for the renewal or replacement of parts.

With these and other objects in view, which will appear as the description proceeds, the invention consists in the novel features of construction, combinations of elements and arrangement of parts hereinafter to be more fully described and pointed out in the appended claims.

In the accompanying drawings:

Figure 1 is a side elevation of the valve comprising the present invention showing the same installed in the pipe line adjacent an oil storage tank, Figure 2 is a vertical sectional view on an enlarged scale taken through the valve, and Figure 3 is a detail horizontal sectional view taken on the line 3—3 of Figure 2 looking in the direction of the arrows.

Referring more particularly to the drawings, the numeral 1 designates the improved valve structure in its entirety and which structure is installed or connected in a pipe line 2 and is preferably located adjacent and below the storage tank 3 which is adapted to hold a quantity of oil or other liquid.

Connecting the bottom wall of the tank 3 with the valve structure 1 is a short pipe line 4 in which is located a globe valve or other manually operated shut-off valve 5 which is normally closed while the tank is being filled.

The valve structure 1 which comprises an elongated casing arranged and connected in an upright position in the pipe line 2, is formed into upper and lower casing sections 6 and 7 which are hollow and have one of their ends closed and the open meeting ends formed with radially disposed flanges 8 and 9. Positioned between the flanges 8 and 9 is a horizontally arranged plate or partition wall 10 which is securely held in place between the flanges by means of bolts or other threaded fastening devices 11 and which wall divides the casing into upper and lower compartments 12 and 13. Formed centrally of the wall 10 and in the longitudinal axis of the valve casing is a threaded opening 14 for the reception of a threaded sleeve 15 provided with upper and lower valve seats 16 and 17. The sleeve 15 extends a considerable distance on each side of the wall 10 and is provided with a lock-nut 18 for holding the sleeve in its fixed position of adjustment. The sleeve may also be formed with interiorly arranged grooves or notches and in which a tool may be inserted for rotating the sleeve relative to the wall 10.

Cooperating with the valve seats 16 and 17 is a pair of hollow float members 19 and 20, one of which is arranged in each compartment. These float members may be formed of any suitable material and of any suitable shape. The floats illustrated are bell shaped and include a spherical wall 21 and a cylindrical portion 22 which is closed by means of a flat wall 23. The spherical walls 21 of the floats are opposed to each other and spaced from each other so that when one of the walls engage with one of the seats formed in the sleeve 16 the other will be disengaged therefrom. To retain the floats in the spaced relation a rod 24 is employed which extends axially through the floats and is connected therewith by means of nuts 25. The rod, for convenience in installation, may extend through the floats and have their outer ends equipped with fastening nuts 26. By means of the nuts 25 and 26 the floats may be adjusted upon the rod 24 to properly vary the distance between the seat engaging face of the floats and the seats formed in the sleeve. To prevent collapsing of the floats upon the tightening of the nuts the same may be provided with sleeves or tube members 27 interposed between the end walls of the float and surrounding the rod 24. The ends of the tubes 27 are soldered or welded to the walls to prevent any leakage between the same and the interior of the float.

The casing sections 6 and 7 are each formed at their lower ends with a boss 28 provided with a threaded opening 29 open to the interior of the valve compartment and in which openings are threadedly received the ends of the pipe lines 2 and 4. The openings 29 are located in a vertical spaced relation with respect to each other to provide a drop or fall of the oil body from the upper to the lower of the compartments through the port 30 provided in the sleeve 15 for communication with each of said compartments.

In operation it will be seen that as the valve 5 is opened the oil will flow from the tank 3 and into the upper of the compartments 12 by way of the pipe line 4 and the opening 29 filling the compartment and due to the buoyancy of the float valve 19 the same will rise free from the seat 16 and uncover the port 30 permitting the oil to flow downwardly to the lower compartment 13 and out through the lower opening 29 and into the pipe line 2. The compartments 12 and 13 are filled or nearly filled with oil. The float members 19 and 20 thus tend to keep afloat and close the port 30, this being of course, prevented by the downward rush of the oil and the suction of the pump on the line, keeping both of the floats spaced from the valve seats permitting the oil to pass freely and without hindrance through the casing. In cases where the vacuum or suction created by the pump is great enough to keep the upper float member in contact with its seat, a plunger 31 is provided which is located at the lower end of the casing 6 and by the inward movement of said plunger the float may be dislodged from its seat breaking the vacuum, after which the oil will flow through the port.

To prevent leakage of oil around the plunger 31 a packing gland 32 is provided and to return the plunger to its outer normal position a spring 33 is interposed between the head 34 of the plunger and the nut 35 of the packing gland 32. Under ordinary conditions the use of a plunger is not needed as the oil has a sufficient force to dislodge the float from its seat. To release any entrapped air which may have collected in the upper compartment 12 an automatic air release valve 36 is positioned in the top of the casing 6 which valve includes a casing 37 open at its ends and is provided with a seat 38 with which a floating ball 39 cooperates.

Ordinarily the ball 39 is free from the seat 38 permitting the air to escape through the casing 37 upon the rising of the liquid level within the compartment 12. However, when said level reaches the ball 39 the same will float and engage the seat thus preventing any escape of oil or liquid therethrough. It will be obvious that as the liquid level recedes the float 39 will again disengage the seat and permit of the free passage of air into the main valve structure. The automatic release, of course, is not an essential part of the valve structure as manually operated means may be employed to permit of air escape from the valve casing.

The float members 19 and 20 which are spaced from their seats due to the buoyancy thereof and the flow of the oil through the valve structure, will, upon the stopping of the oil flow or when the tank and line become empty, immediately drop and the upper float 19 engage the upper seat shutting the line off and preventing the entry of air thereinto. This action is even more positive in that the floats are connected and the lower thereof will help due to the added weight to centralize the upper float member and hold the same in firm relation with its seat. Again, if during the pumping operation the flow of the oil should stop for any reason and the oil should tend to back up in the line, the two float members will jointly act to close the port in the division wall and prevent the oil from passing beyond the valve.

From the foregoing it will be seen that an automatic shut-off valve or regulator has been provided which is self-acting and which will permit of the free passage of oil therethrough in a pre-determined direction, but which will close upon the flow of the oil in the opposite direction. Moreover, the valve has the advantage of closing when the flow of oil is ceased and the line becomes empty, thus shutting out air which would otherwise enter the line. An important feature of a valve of this kind is that by its closing when the line is empty the same will prevent evaporation losses which are heavy when the line is open. The valve has the advantage of being easily installed and kept in an operating condition without undue attention from an operator's standpoint.

What is claimed is:

1. A shut-off valve comprising a casing closed at its ends and divided centrally by a partition wall into upper and lower compartments, a liquid inlet and outlet open to said compartments, said partition wall being provided with a port having a seat located on each side of said wall, a float member in each of said compartments joined to one another in a spaced relation, either of said float members serving to engage a seat to close said port upon the stoppage of liquid flow through said valve.

2. A shut-off valve comprising a casing formed into two half-sections, each of said half-sections having a closed end wall and an open end provided with a radially disposed flange, a partition wall disposed between said flanges and secured thereto in a clamped relation, said wall dividing the casing into upper and lower compartments, a liquid inlet and outlet in the side walls of said compartment and adapted for connection with associated pipe lines, said partition wall being provided with a centrally located port communicating with each of said compartments, a float member in each of said compartments, either of said floats being adapted for cooperation with said port to open and close the latter in response to movement of the liquid within said casing.

3. A shut-off valve comprising an elongated casing divided into upper and lower compartments by a partition wall, a centrally located opening formed in said wall, an adjustable open ended sleeve positioned in said opening and formed with a seat at each end, a liquid inlet for the upper of said compartments, an outlet for the lower of said compartments, a float member arranged in each of said compartments adapted for cooperation with said seat, and a connection between said float members and extending through said sleeve.

4. A shut-off valve comprising an elongated casing divided into upper and lower compartments by a transversely arranged partition wall, said wall being provided with a threaded opening, a threaded sleeve positioned in said opening and formed with a seat at each end thereof, means for locking said sleeve in its adjusted position, a hollow float member in each of said compartments adapted for engagement with said seats, a removable and adjustable connection connecting said floats and passing through said sleeve, and a liquid inlet and outlet formed in the side walls of said compartments and disposed at the lower end thereof.

5. A shut-off valve comprising a casing formed into a pair of half-sections which are closed at their outer ends and joined to one another at their inner opposite open ends, a partition wall positioned between the meeting ends of said sections and held therebetween in a fluid tight relationship, said partition wall dividing the casing into upper and lower compartments, a liquid inlet to the upper of said compartments located at a point above and adjacent said wall, a liquid outlet in the lower of said compartments vertically spaced from said inlet, said inlet and outlet being adapted for connection with associated pipe lines, and a hollow float in each of said compartments adapted to open and close the port formed in said partition wall in response to liquid fluctuations within said casing.

6. A shut-off valve comprising a cylindrical casing formed with an inlet and outlet opening, a partition wall in said casing located between said opening and dividing the casing into upper and lower compartments, said wall being provided with an open port communicating with said compartments, a float member in each of said compartments connected together by a rod extending through said port, said rod serving to hold said floats in a spaced relation with one another, an air release positioned at the upper end of said upper compartment, said floats serving, upon the rise and fall due to the presence and absence of the liquid within the casing, to close said port.

7. In a device of the character described comprising a cylindrical casing adapted for its connection in the liquid flow line, an inlet and outlet in said casing to which said line is connected for the passage of liquid through said casing, said casing being divided into upper and lower compartments by a partition wall arranged between said inlet and outlet, a centrally located port in said wall in open communication with each of said compartments, a float in each of said compartments adapted to cooperate with the port in said wall, a connection between said floats for holding the latter in a spaced relation from one another, and a plunger member positioned in one of the walls of the casing and adapted upon an inward movement thereof to engage with one of said floats.

8. A shut-off valve comprising a casing, a wall within said casing dividing the latter into a pair of compartments, a liquid inlet and outlet to said compartments, said wall being provided with a port open to both of said compartments, seats formed with said ports and located one on each side of said wall, a valve member formed to include a buoyant seat engaging section positioned in each of said compartments, a connection between said sections extending through said port, said connection being such that said valve sections may alternatively engage and disengage said seats upon the rise and fall of the liquid passing through said port, and movable means extending through the wall of said casing for forcing said valve member to a port opening position.

In testimony whereof we affix our signatures.

RALPH D. O'NEIL.
JOHN O'NEIL.